United States Patent [19]

Rizhanovsky

[11] Patent Number: 6,131,728
[45] Date of Patent: Oct. 17, 2000

[54] BELT JOINT COVER

[75] Inventor: Aron Rizhanovsky, Saskatoon, Canada

[73] Assignee: Precision Metal Fabricating Ltd., Saskatoon, Canada

[21] Appl. No.: 09/099,568

[22] Filed: Jun. 18, 1998

[51] Int. Cl.[7] .................................................. B65G 15/30
[52] U.S. Cl. ................................. 198/844.2; 198/844.1; 474/218; 474/253
[58] Field of Search ........................... 198/844.2, 844.1; 474/218, 253; 24/31

[56] References Cited

U.S. PATENT DOCUMENTS

| | | |
|---|---|---|
| 794,342 | 7/1905 | Buchanan . |
| 4,540,389 | 9/1985 | Ramsey ..................................... 474/257 |
| 4,757,576 | 7/1988 | Jaubert ..................................... 24/31 R |
| 4,906,226 | 3/1990 | Hecker et al. ........................... 474/257 |
| 4,929,222 | 5/1990 | Smith et al. ............................. 474/255 |
| 4,952,261 | 8/1990 | Nosaka et al. .......................... 156/138 |
| 5,240,534 | 8/1993 | Tokita et al. ............................ 156/157 |

*Primary Examiner*—Christopher P. Ellis
*Assistant Examiner*—Jeffrey A Shapiro
*Attorney, Agent, or Firm*—Patterson & Keough, P.A.

[57] ABSTRACT

The invention provides a cover for an over-lapping conveyor belt joint. The cover prevents gaps between the belts at the joint and draws the bolt heads into a recess on the underside of the joint, thereby reducing belt jump as the bolt heads pass over the rollers. The invention may also protect the leading edge of the upper belt. The invention is well suited to use on agricultural swath pick-ups such as those used on combines.

13 Claims, 3 Drawing Sheets

A-A

BELT JOINT COVER

This invention deals with the field of conveyor belts and in particular with an improved apparatus for joining such belts with an over-lapping joint.

BACKGROUND

Over-lapping conveyor belt joints are known and used in many applications. In recent years agricultural swath pick-up belts have used the over-lapping joint wherein the two ends of the belt are over-lapped and bolted together. On the whole such a joint has been an improvement over the prior joining method of a pin through lacings on each end of the belt.

A problem with the over-lapping joint is that the bolts squash the belt, causing the belt material to buckle and gap between the bolts. When used on an agricultural swath pick-up such as that used on combines, crop material becomes jammed in these gaps causing pressure and stress on the belt material. In other applications, material of various kinds causes the same problem. The industry has used a straight plate over the gap in an attempt to remedy the problem with little success.

Another problem with the over-lapping joint is that the flat bolt heads on the underside of the joint cause the belt to jump when passing over the roller, stressing the rollers and belts as well as causing vibration.

The present invention provides a belt joint cover which is formed so as to alleviate these problems.

SUMMARY OF THE INVENTION

It is the object of the present invention to provide an over-lapping belt joint wherein the upper and lower belts are held together between the fasteners of the joint, thereby preventing gaps between the belts.

It is the further object of the present invention to provide such an over-lapping belt joint reduces stresses resulting from bolt heads passing over the conveyor rollers.

The present invention accomplishes these objects providing an apparatus for joining the ends of a conveyor belt in an over-lapping joint, said joint joining an upper belt end and a lower belt end, said apparatus comprising a plurality of bolts inserted through mating holes in the upper and lower belt ends of an overlapping conveyor beltjoint such that the heads of said bolts are adjacent to the lower surface of said lower belt end and the threaded ends of said bolts extend above the upper surface of said upper belt end; a cover over the length of said joint, said cover attached by inserting said threaded bolt ends through mating holes in said cover, and screwing nuts onto said threaded bolt ends, and said cover defining a recess along a central portion thereof, said cover, when said nuts are tightened on said threaded bolt ends, exerting a flat force against said upper surface of said upper belt along the end edge of said upper belt, said force thereby exerted on a first side of said bolt heads, and said cover exerting a second force against said upper surface of said upper belt along a line on the opposite second side of said bolt heads, said bolt heads thereby being drawn into a recess on the lower side of said joint between said first and second forces.

The invention is particularly suited to application on an agricultural swath belt pick-up, such as those used on combines.

Preferably the bolts used in the joint are flat-headed bolts such as are commonly used in such joints.

The cover could preferably extend down over the end edge of the upper belt to partially cover and protect the edge. This portion of the cover should only partially cover edge so as not to come into contact with the adjacent lower belt end. Such contact could damage the belt.

The cover could be a plate having a first plate portion partially covering the end edge of the upper belt end, thence bending down to a second plate portion exerting the first force, thence bending down to a third plate portion defining the mating holes, thence bending down to a fourth plate portion exerting the second force.

The invention thereby holds the upper and lower belt ends together between the joint fasteners. That portion of the cover plate that extends down over the end edge of the upper belt adds rigidity to the cover plate and also protects the exposed edge.

The invention also reduces stresses on the belt and roller by drawing the bolt heads into a recess on the bottom side of the joint thereby reducing the "jump" as the joint passes over the conveyor rollers.

The invention also provides an apparatus for covering the top of an over-lapping joint of the upper and lower belt ends of a conveyor belt comprising: a formed plate defining a recess along a central portion thereof, said plate fastened over the top of over-lapping joint by attachment to the joint fasteners; said plate exerting two separate downward forces across the upper surface of the upper belt end of said over-lapping joint, one said force on each side of said joint fasteners, the lower ends of said joint fasteners thereby being drawn into a recess on said lower side of said joint.

Those portions of the plate on each side of the recess could preferably exert the two forces in response to forces applied to the plate by the joint fasteners.

A portion of the plate could preferably extend down over the end edge of the upper belt end thereby partially covering the edge and protecting it.

The belt could preferably travel in the direction such that the end edge of the upper belt is the leading edge, the end edge of the lower belt end thereby being the trailing edge and thereby preventing the lower belt end from folding under when contacting the roller.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

The present invention provides an apparatus for joining the ends of a conveyor belt in an over-lapping joint, said joint joining an upper belt end and a lower belt end, said apparatus comprising a plurality of bolts inserted through mating holes in the upper and lower belt ends of an overlapping conveyor belt joint such that the heads of said bolts are adjacent to the lower surface of said lower belt end and the threaded ends of said bolts extend above the upper surface of said upper belt end; a cover over the length of said joint, said cover attached by inserting said threaded bolt ends through mating holes in said cover, and screwing nuts onto said threaded bolt ends, and said cover defining a recess along a central portion thereof; said cover, when said nuts are tightened on said threaded bolt ends, exerting a first force against said upper surface of said upper belt along the end edge of said upper belt, said force thereby exerted on a first side of said bolt heads, and said cover exerting a second force against said upper surface of said upper belt along a line on the opposite second side of said bolt heads, said bolt heads thereby being drawn into a recess on the lower side of said joint between said first and second forces. This embodiment is well suited to use in joining the pick-up belts of an agricultural swath pick-up such as is used on a combine.

The invention also provides an apparatus for covering the top of an over-lapping joint of the upper and lower belt ends of a conveyor belt comprising: a formed plate defining a recess along a central portion thereof, said plate fastened over the top of over-lapping joint by attachment to the joint fasteners; said plate exerting two separate downward forces across the upper surface of the upper belt end of said over-lapping joint, one said force on each side of said joint fasteners, the lower ends of said joint fasteners thereby being drawn into a recess on said lower side of said joint.

Figure 1:
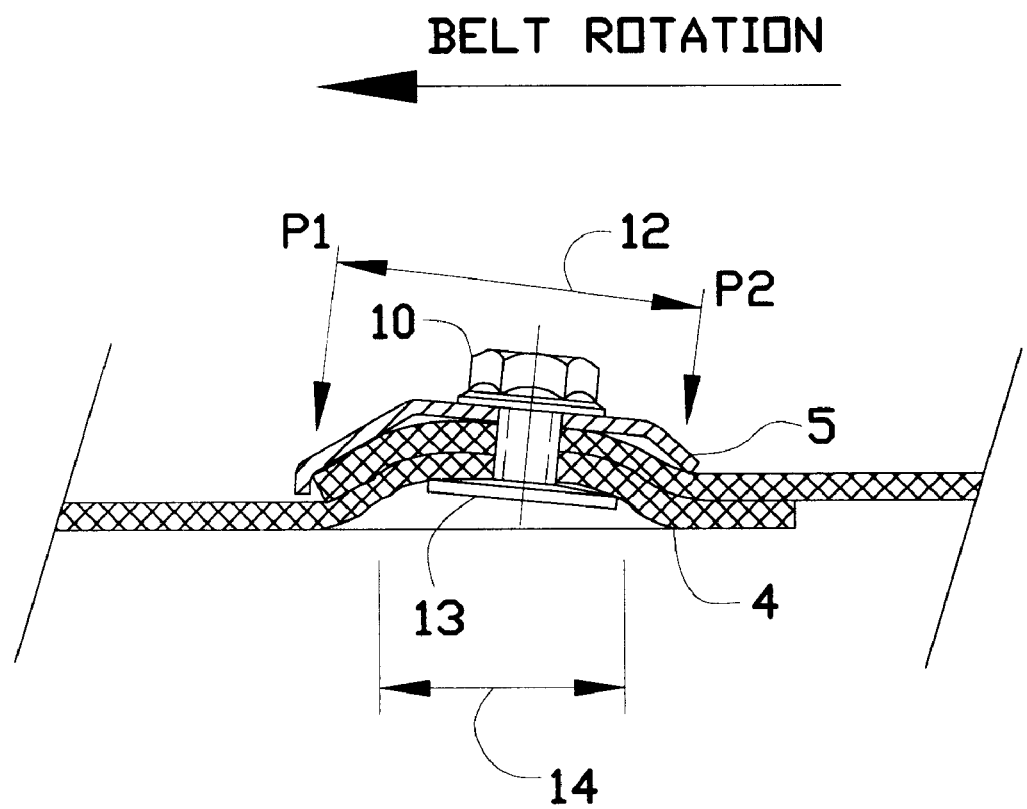
FIG. 1 is a cross-sectional side view of the preferred embodiment.
Figure 2:
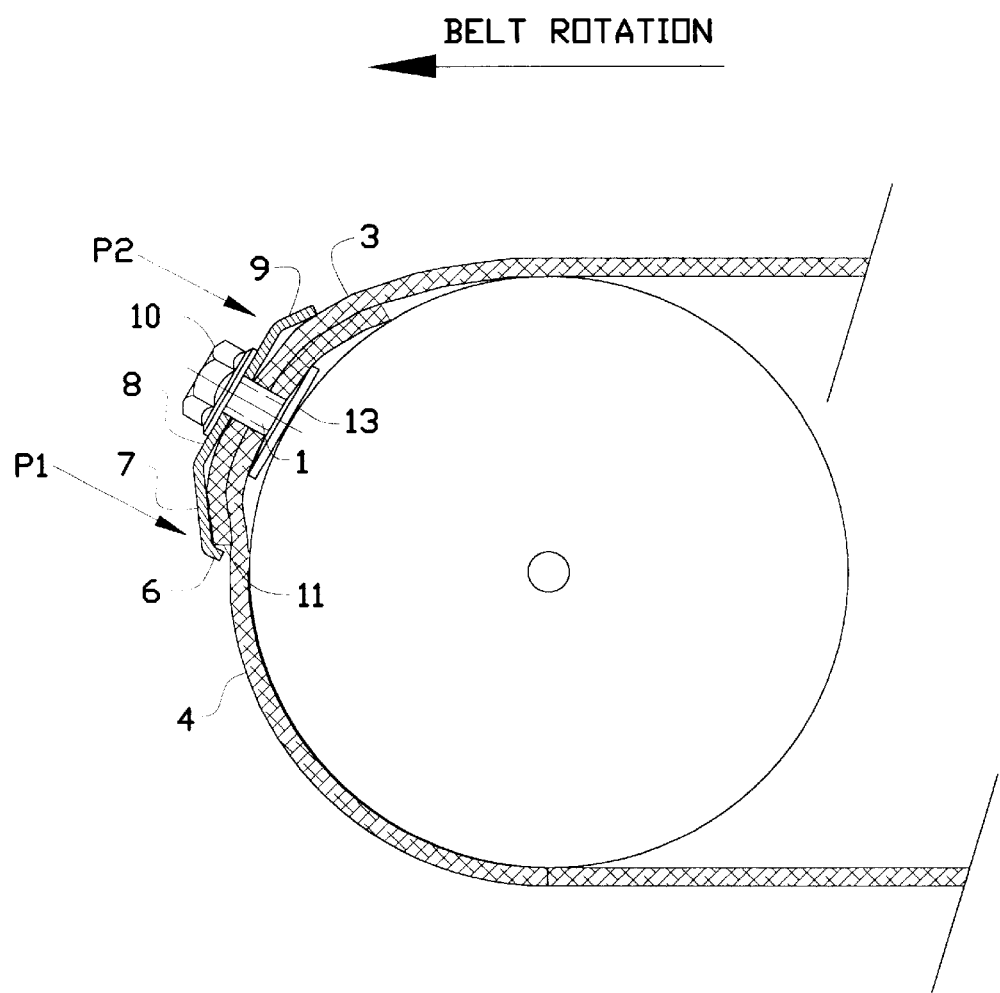
FIG. 2 is a cross-sectional side view of the embodiment of FIG. 1 as the joint passes over a conveyor roller.
Figure 3:
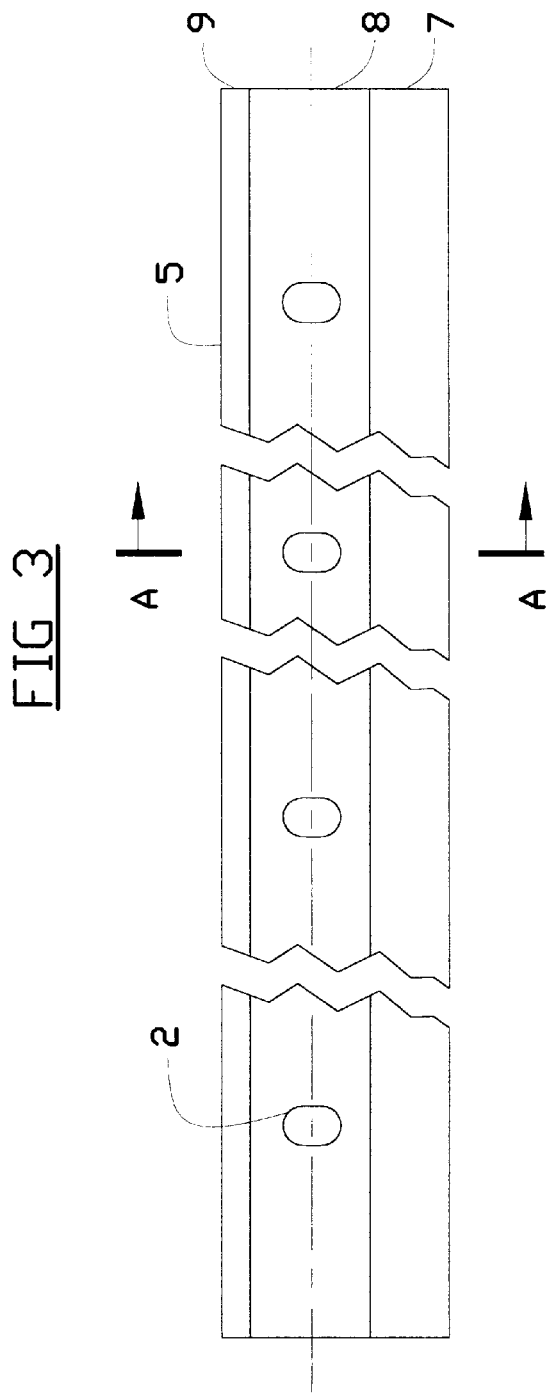
FIG. 3 is a top view of the embodiment of FIG. 1.
Figure 4:
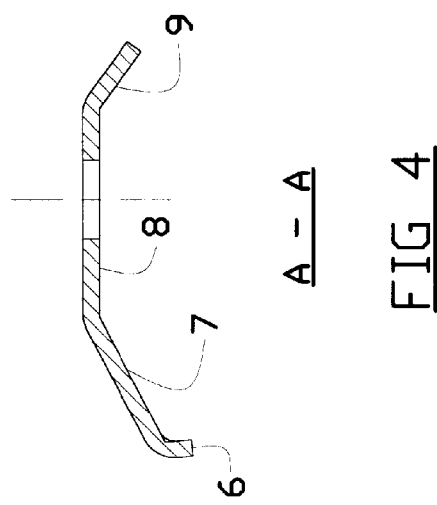
Fig. 4 is a cross-sectional view along line A—A in FIG. 3.

A preferred embodiment of the present invention is illustrated in FIGS. 1 to 4. Flat-headed bolts 1 are inserted in mating holes 2 in the upper belt end 3, lower belt end 4 and cover plate 5, and fastened with nuts 10. A first cover plate portion 6 bends down to partially cover and protect the end edge 11 of the upper belt end 3. A second cover plate portion 7 exerts a first force P1 along the end edge 11, in response to the tensioning force of the bolts 1 and nuts 10 on a third cover plate portion 8. A fourth cover plate portion 9 exerts a force P2 across the surface of the upper belt end 3. The cover plate portions 6, 7, 8 and 9 form a recess 12 between the plate's two edges, which impart two forces P1 and P2 to both belt ends.

Tensioning the nuts 10 on bolts 1 draws the flat bolt heads 13 into a corresponding recess 14 on the lower side of the belt joint. The belt and roller stresses caused by the "jump" when the flat bolt heads 13 pass over the roller 15 are thereby substantially reduced.

The belt rotation as indicated is the preferred direction of rotation, with the end edge 11 as the leading edge. This direction allows the lower belt end 4 to trail, avoiding the possibility that it might catch on the roller 15 and bend over, distorting the belt and causing a pronounced jump when passing over the roller 15.

Thus it can be seen that the invention accomplishes all of its stated objectives. The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

I claim:

1. An apparatus for joining the ends of a conveyor belt in an over-lapping joint, said joint joining an upper belt end and a lower belt end, said apparatus comprising:

a plurality of bolts capable of being inserted through mating holes in the upper and lower belt ends of an over-lapping conveyor belt joint such that the heads of said bolts are adjacent to the lower surface of said lower belt end and the threaded ends of said bolts extend above the upper surface of said upper belt end;

a cover over the length of said joint, said cover attached by inserting said threaded bolt ends through mating holes in said cover, and screwing nuts onto said threaded bolt ends, and said cover defining a recess along a central portion thereof;

said cover, when said nuts are tightened on said threaded bolt ends, exerting a first force against said upper surface of said upper belt along an end edge of said upper belt, said force thereby exerted on a first side of said bolt heads, and said cover exerting a second force against said upper surface of said upper belt along a line on the opposite second side of said bolt heads, said bolt heads thereby being drawn into a recess on the lower side of said joint between said first and second forces.

2. The device of claim 1 wherein the conveyor belt travel is such that the upper belt end edge is the leading edge.

3. The device of claim 1 wherein said bolt heads are flat.

4. The device of claim 3 wherein said cover extends down over said end edge of said upper belt to partially cover said end edge of said upper belt.

5. The device of claim 4 wherein said cover is a plate having a first plate portion partially covering the end edge of said upper belt end, thence bending down to a second plate portion exerting said first force, thence bending down to a third plate portion defining said mating holes, thence bending down to a fourth plate portion exerting said second force.

6. The device of claim 5 wherein the conveyor belt travel is such that the upper belt end edge is the leading edge.

7. An apparatus for covering the top of an over-lapping joint of the upper and lower belt ends of a conveyor belt comprising:

a formed plate defining a recess along a central portion thereof, said plate fastened over the top of said over-lapping joint by attachment to a set of joint fasteners;

said plate exerting two separate downward forces across the upper surface of the upper belt end of said over-lapping joint, one said force on each side of said joint fasteners, the lower ends of said joint fasteners thereby being drawn into a recess on said lower side of said joint.

8. The device of claim 7 wherein the portions of said plate on each side of said recess exert said forces in response to forces applied to said plate by said joint fasteners.

9. The device of claim 8 wherein a portion of said plate extends down over the end edge of said upper belt end of said over-lapping joint, thereby partially covering said end edge of said upper belt end.

10. The device of claim 9 wherein the conveyor belt travel is such that the upper belt end edge is the leading edge.

11. On an agricultural swath belt pick-up, an apparatus for joining the ends of the pickup belts in an over-lapping joint, said joint joining an upper belt end and a lower belt end, said apparatus comprising:

a plurality of bolts capable of being inserted through mating holes in an upper and a lower belt end of an over-lapping pick-up belt joint such that the heads of said bolts are adjacent to a lower surface of said lower belt end and a respective threaded end of said bolts extend above the upper surface of said upper belt end;

a cover over the length of said joint, said cover attached by inserting said threaded bolt ends through mating holes in said cover, and screwing nuts onto said threaded bolt ends, and said cover defining a recess along a central portion thereof;

said cover, when said nuts are tightened on said threaded bolt ends, exerting a first force against said upper surface of said upper belt along an end edge of said upper belt, said force thereby exerted on a first side of said bolt heads, and said cover exerting a second force against said upper surface of said upper belt along a line on the opposite second side of said bolt heads, said bolt heads thereby being drawn into a recess on the lower side of said joint between said first and second forces.

12. The device of claim 8 wherein said cover is a plate having a first plate portion partially covering the end edge of said upper belt end, thence bending down to a second plate portion exerting said first force, thence bending down to a third plate portion defining said mating holes, thence bending down to a fourth plate portion exerting said second force.

13. The device of claim 12 wherein the pick-up belt travel is such that the upper belt end edge is the leading edge.

\* \* \* \* \*